United States Patent [19]

Reingold

[11] 4,214,442
[45] Jul. 29, 1980

[54] COMBUSTION CHAMBERS OPERATING ON A SUPERSONIC STREAM CHIEFLY FOR JET ENGINES

[75] Inventor: Lucien Reingold, Paris, France

[73] Assignee: Societe Nationale d'Etude et de Construction de Moteurs d'Aviation, Paris, France

[21] Appl. No.: 752,451

[22] Filed: Aug. 8, 1968

[51] Int. Cl.³ .............................................. F02K 7/10
[52] U.S. Cl. .................................. 60/270 R; 60/39.06; 60/39.82 R; 60/749
[58] Field of Search .................... 60/39.72, 270, 39.82, 60/39.06, 39.72 R, 39.82 R, 39.06, 270 R Primary Examiner—Stephen C. Bentley
Attorney, Agent, or Firm—Fleit & Jacobson

[57] ABSTRACT

A method for producing a permanent combustion under detonating or substantially detonating conditions within a stream flowing at supersonic speed, consisting in subdividing a stream of combustion-sustaining fluid into two parallel streams, modifying the speed of at least one of said streams, causing said streams flowing at different speeds to meet again inside an area wherein a diabolo-shaped system of shock waves is formed and injecting fuel into the stream flowing at the higher speed, the combustion starting on the downstream side of a flat surface extending perpendicularly to the direction of flow and forming the surface of minimum cross-sectional area of the diabolo-shaped system.

15 Claims, 19 Drawing Figures

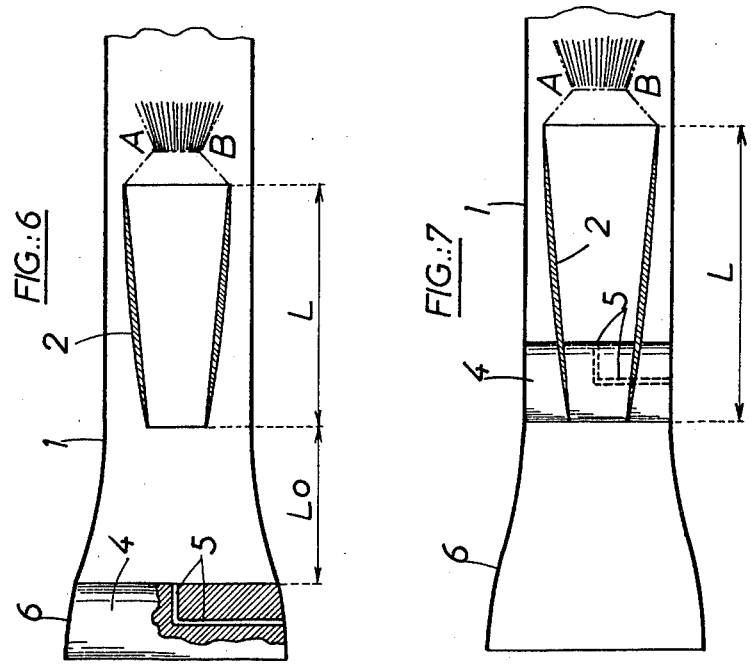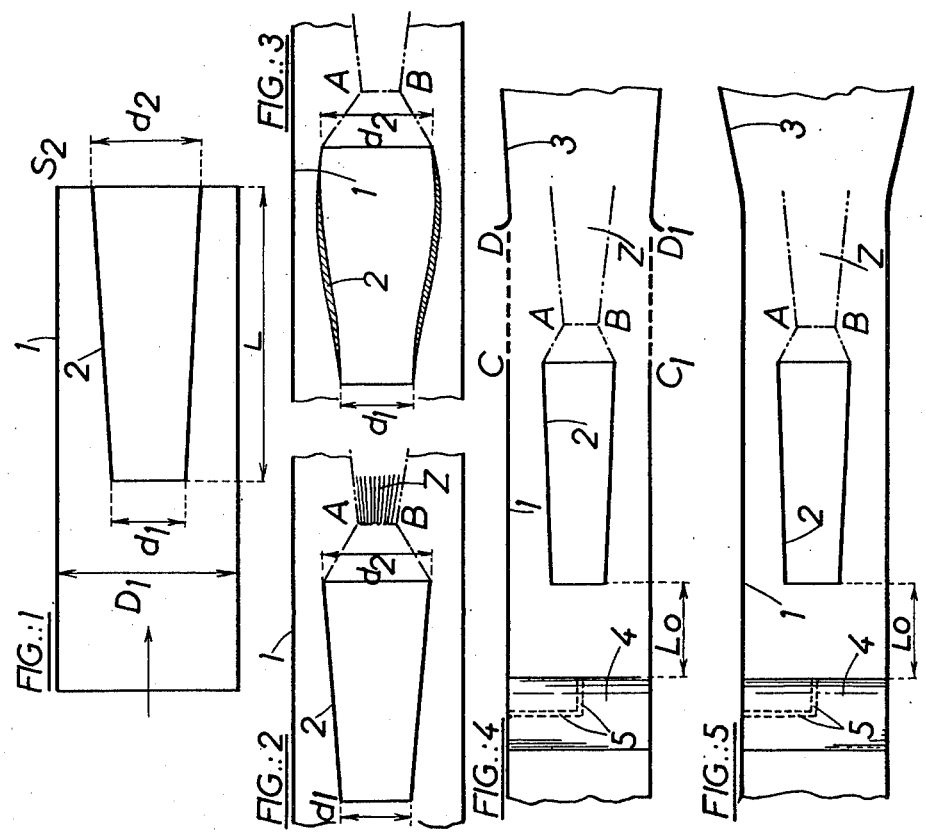

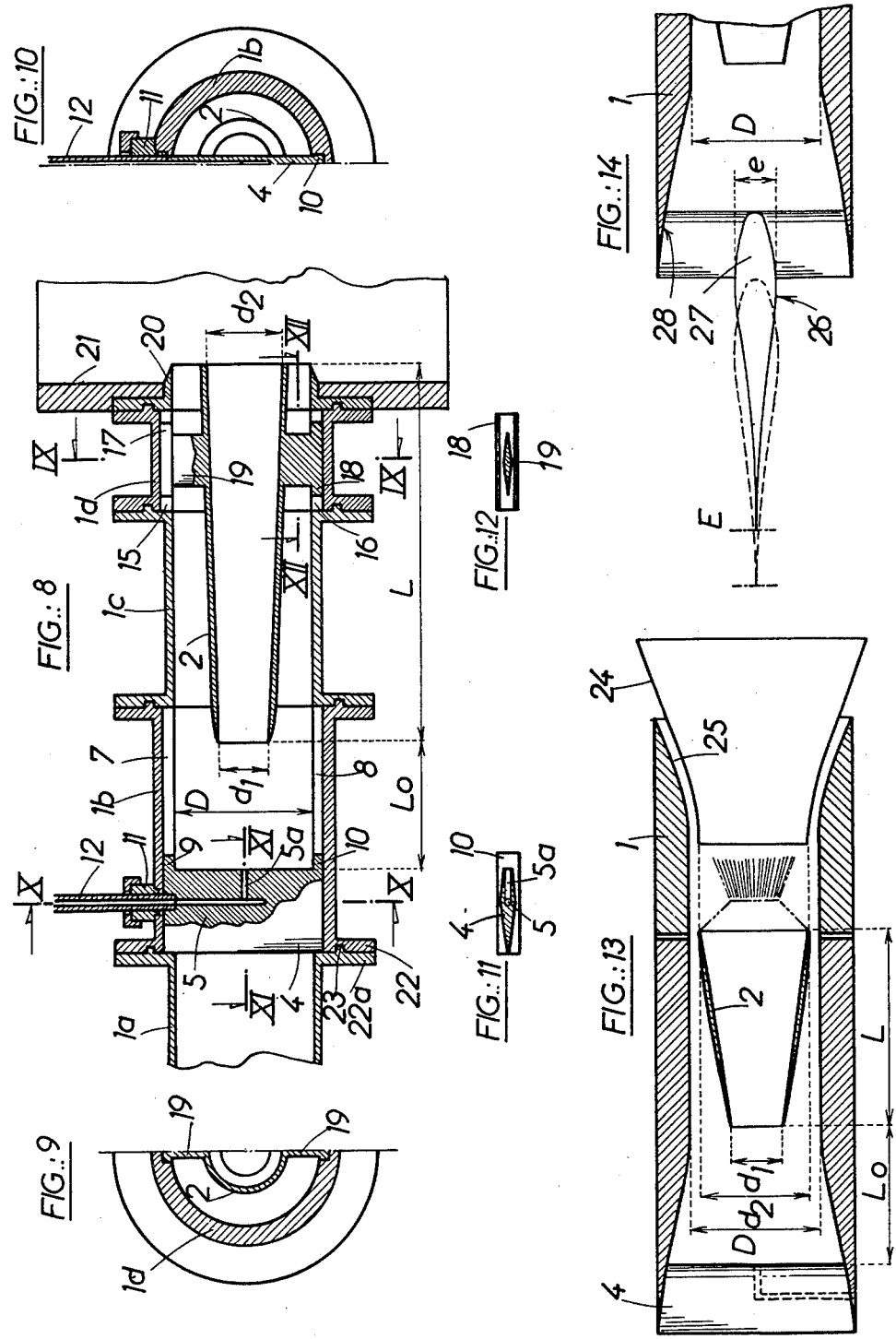

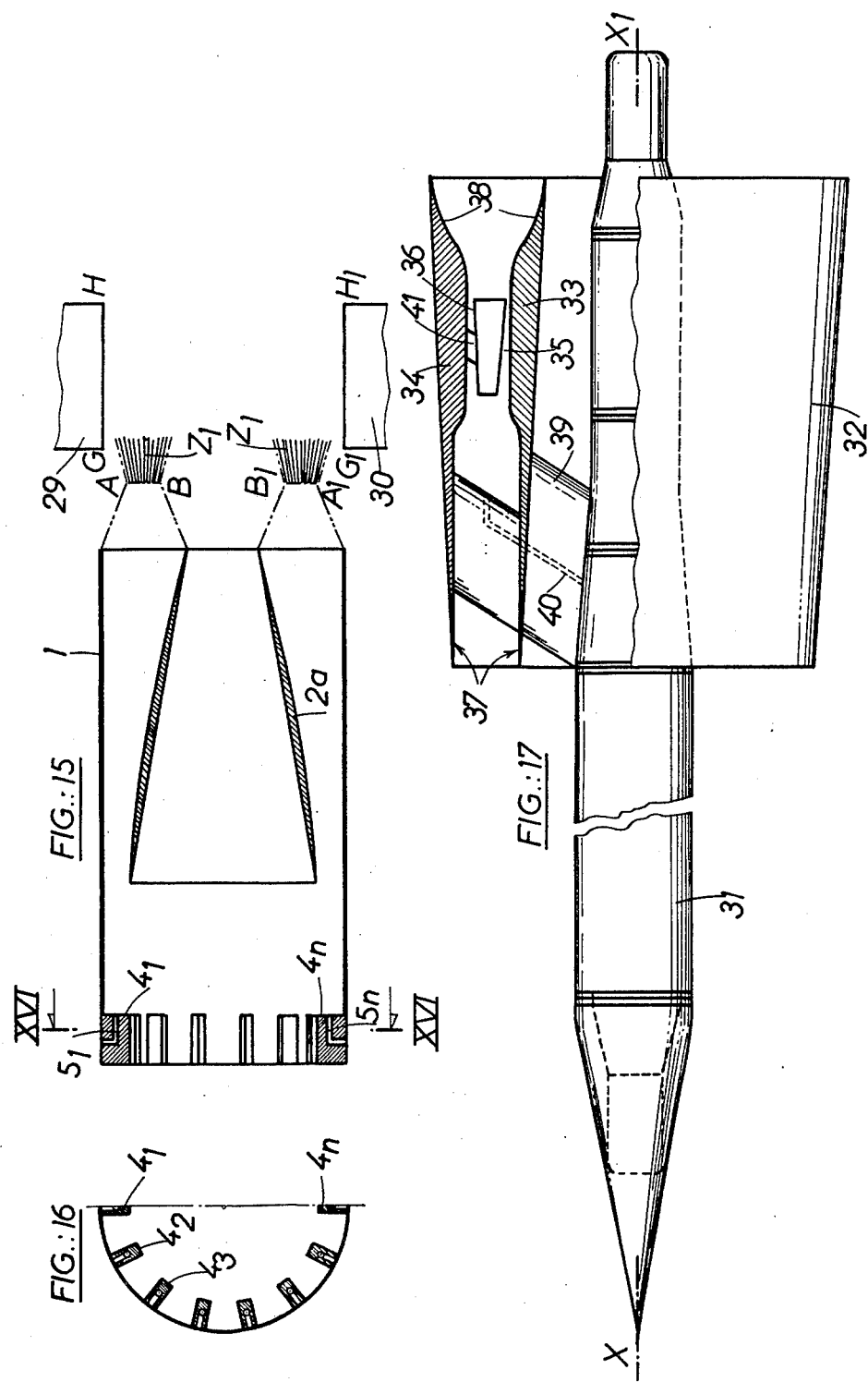

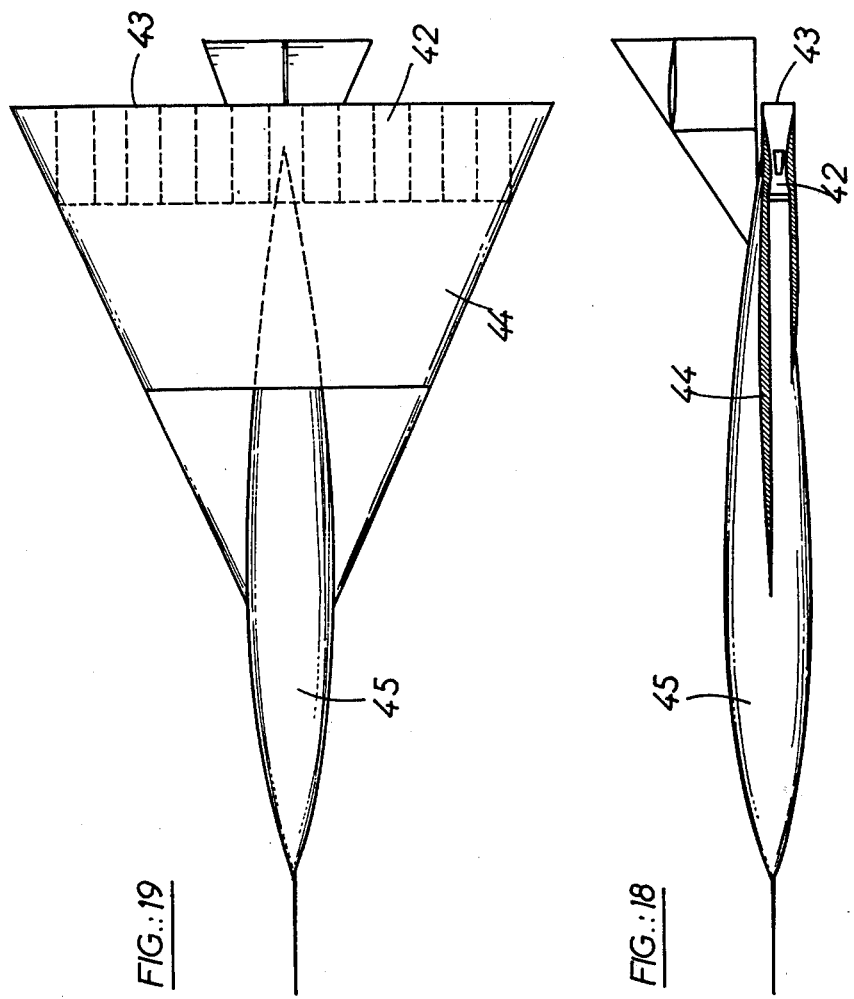
FIG.:19
FIG.:18

COMBUSTION CHAMBERS OPERATING ON A SUPERSONIC STREAM CHIEFLY FOR JET ENGINES

FIELD OF THE INVENTION

The present invention relates to improvements in the combustion of mixtures flowing at supersonic speeds and it also covers the application of such improvements chiefly in the case of jet engines adapted to propel aircrafts and the like machines.

BACKGROUND OF THE INVENTION

Present day technique resorts chiefly as concerns the field of ramjets to the heat energy obtained by transforming under permanent operative conditions the potential energy of fuel inside a combustion chamber through which a gasiform current flows at a clearly subsonic speed, corresponding for instance to a Mach number equal to 0.15 at a maximum. The conditions governing the combustion and its propagation have a deflagrating character and the stabilisation of the flame (in the case where the components of the combustive mixture have been mixed beforehand) or that of the reaction area (that is of the diffusion flame in the case of a direct injection of fuel) is obtained by producing inside the gasiform stream a macroturbulence obtained by mechanical means.

The possibilities of obtaining such combustion chambers working under subsonic conditions are limited, on the one hand by the large size of the chambers which are necessary by reason of the low speed of flow of the gasiform stream and by the necessary expansion of the reaction area wherein a deflagrating combustion is produced, and on the other hand by the maximum temperatures allowable, which depend on the characteristic thermic resistance of the material forming the mechanical means with which the flame is necessarily in contact.

It is true that it is possible, as well-known in the art, to produce and maintain a detonating or substantially detonating combustion within a gasiform stream flowing permanently at a supersonic speed, practically at a Mach number equal to or about about 1.2 provided said combustion is stabilized by means of a shock wave stabilized in its turn inside the supersonic stream. A combustion chamber of such a type has been described for instance in the French Pat. No. 1 008 660 which shows how a stable shock wave may be obtained by the impact of a gasiform stream flowing at a supersonic speed against a hindrance constituted for instance by the leading edge of a diffuser. The shock wave thus obtained is in the shape of a surface extending transversely of the direction of the stream and supported by the hindrance which has produced it. Thus, the combustion area is necessarily in contact with the structural member forming the hindrance of which the resistance against heat limits the maximum allowable temperature, which may be reached during combustion.

SUMMARY OF THE INVENTION

The present invention relates to a method for producing a permanent supersonic combustion of a detonating or substantially detonating character, which allows producing a combustion chamber in which the heat energy to be used is obtained at temperatures which are no longer limited in practice by the heat resistance properties of the material forming said chamber.

The invention covers in particular a method for permanent combustion inside a supersonic stream of fluid of a detonating or substantially detonating character such that the combustion is started and stabilized within a shock wave system in the shape of a so-called diabolo or double lambda, said shock wave being in its turn stabilized at the downstream end of a supersonic diffuser which is suitably arranged within the combustion chamber inside which the combustible mixture flows. Said shock wave system comprises a straight or normal portion in a plane normal to the general direction of the stream within the restricted area of the diabolo and it is found that the flame is stabilized in said normal portion outside any material contact with the structural components of the combustion chamber. Said stabilization of the detonating or substantially detonating flame is ascribable to a microturbulence produced within the stream on the downstream side of said shock wave.

The improved method according to the invention comprises chiefly the steps of subdividing the supersonic stream of combustion-sustaining fluid into two parallel streams; modifying the speed of at least one of said parallel streams; causing the two parallel streams flowing at different speeds to meet again in an area where a shock wave system of a diabolo shape is obtained; and injecting fuel into the stream flowing at a higher speed, so as to start the combustion on the downstream side of a plane surface perpendicular to the direction of flow and forming the restricted section of the diabolo.

Such a method allows not only a considerable reduction in the size of the combustion chamber under predetermined throughput conditions with reference to the size of a combustion chamber in which the fluid flows at a subsonic speed, this being ascribable to the actual high speed of flow and also to the small size of the detonating or substantially detonating combustion area as compared with the size of a deflagrating combustion area, but, the temperatures which may be reached are extremely high without any detrimental action on the material forming the chamber components, which are spaced away from said combustion area and may be made consequently of any conventional material such as a light alloy.

It should be remarked that in certain cases the inter-engagement at the downstream end of the diffuser of supersonic streams having different Mach numbers may produce a wave shock system which is no longer exactly of a diabolo shape but rather of an X shape which corresponds to a limit shape of the diabolo wave wherein the constricted area of the diabolo is reduced substantially to a point, the diabolo itself being then reduced to a double cone. Now, provided the speed of the accelerated subdivided stream corresponds to a comparatively high Mach number of a magnitude equal to 4 for instance, it is possible to produce and stabilize a permanent detonating or substantially detonating combustion on the downstream side of the upstream arms of the X, without the flame being capable of detrimentally acting on the downstream section of the diffuser, which is cooled by the flow of the combustion-sustaining fluid at a lower speed. Said combustion of the so-called oblique wave type is merely a particular case of the combustion on a diabolo wave and consequently said last "diabolo wave" expression should be considered as including the limit case of an X wave.

An apparatus for executing said method includes chiefly an outer chamber through which a stream of combusting-sustaining fluid flows at a supersonic speed and a channel section extending inside the chamber so as to subdivide the flow of combustion-sustaining fluid into two supersonic streams of which one passes inside said channel section and the other within the gap defined between the outer wall of said chamber and said channel, the shapes of said chamber and channel being such that the cross-sectional area of at least one of the two streams may vary in the direction of flow, whereby the two streams assume at the downstream end of the inner channel section different Mach numbers, the meeting of the two streams at such a point producing a diabolo shaped or double lambda shock wave system with a constricted cross-section perpendicular to the axis of the stream and spaced beyond the trailing end of the inner channel.

The outer chamber may be for instance of a cylindrical shape while the inner channel section is then constituted by a diffuser.

If the accelerated stream is that flowing inwardly or centrally, which is obtained under supersonic aerodynamic conditions by a gradual increase of the cross-section of the diffuser in the direction of flow with a corresponding deceleration of the outer stream, the diabolo shock wave is formed centrally at the output end of the diffuser.

If, in contradistinction, the central or inner flow is decelerated by a gradual reduction in size of the cross-section of the diffuser in the direction of flow with a corresponding acceleration of the outer stream, the shock wave is formed with an annular shape at the output end of the diffuser while retaining its diabolo shape.

For obvious reasons, the injection of fuel into the stream of combustion-sustaining fluid should in the first case be executed centrally and in the second case outwardly along an annulus since no combustion can be obtained in the part of the cross-section of the stream which is not subjected to the shock wave.

The supersonic burner according to the invention which allows producing small sized combustion chambers made of a conventional material and for instance of a light alloy, while very high temperatures are reached, leads to the execution of various apparatus intended for practical use and of an original design.

A first embodiment of such an apparatus of the type wherein the combustion area is arranged centrally is of particular interest for the execution of ramjets of the supersonic type working at high Mach numbers. A second embodiment wherein the combustion area is arranged outwardly and annularly is of interest for apparatus treating at very high temperatures surfaces which are set in contact with such an outer annular combustion area, said combustion area lying however at a distance from the structural components of the actual combustion chamber. It should be remarked that at such high temperatures the gases are subjected to a considerable ionization and form the so-called plasma the electronic properties of which may also be resorted to for various applications.

Further features of the invention will appear from the reading of the following description, reference being made to the accompanying drawings.

BRIEF DESCRIPTION OF THE DRAWINGS

In said drawings:

FIG. 1 is a diagram illustrating the principle underlying the supersonic burner according to the invention.

FIGS. 2 and 3 illustrate two embodiments of divergent diffusers arranged inside the burner in conformity with the invention.

FIGS. 4 and 5 illustrate two embodiments of a chamber provided with a supersonic burner according to the invention.

FIGS. 6 and 7 show, by way of examples, two possible manners of injecting the fuel.

FIG. 8 is an axial sectional view of a practical embodiment of a supersonic burner according to the invention.

FIGS. 9 to 12 are sectional views through lines IX—IX, X—X, XI—XI, XII—XII of FIG. 8.

FIG. 13 is an axial sectional view of an application of the invention to a ramjet.

FIG. 14 is an axial sectional view of the upstream section of a ramjet provided with means adjusting the cross-sectional inlet area.

FIG. 15 illustrates a combustion chamber wherein the combustion area is arranged outwardly.

FIG. 16 is a cross-sectional view through line XVI—XVI of FIG. 15.

FIG. 17 illustrates an aircraft incorporating a supersonic ramjet of an annular shape.

FIGS. 18 and 19 illustrate an aircraft equipped with a supersonic ramjet of a prismatic shape for a propelling wing.

DESCRIPTION OF PREFERRED EMBODIMENTS

The principle underlying the operation of a supersonic burner according to the invention is illustrated in FIG. 1 wherein the reference number 1 designates a chamber which may for instance be in the shape of a cylinder of a diameter $D_1$ through which a stream of air or the like combustion-sustaining fluid flows at a supersonic speed defined by a Mach number $M_1$. A diffuser 2 the lenght of which is L and the diameter of which at the imput is equal to $d_1$ while its outlet diameter is equal to $d_2$ extends inside the chamber 1, its axis being parallel or preferably coinciding with the axis of the chamber.

In the example illustrated, the diffuser 2 is divergent which, in conformity with the laws of supersonic aerodynamics, procudes an acceleration of the central or inner stream flowing through the diffuser, until said stream reaches a Mach number $M_i$ at the downstream end of the diffuser whereas the stream flowing within the outer or annular convergent area extending between the diffuser 2 and the periphery of the chamber 1 is decelerated down to a Mach number $M_e$ which is smaller than $M_i$.

The two streams meet in the plane $S_2$ registering with the outlet opening of the diffuser, so as to produce as shown in FIG. 2 a stable shock wave system assuming the shape of a diabolo or of a double lambda the periphery of which is approximately defined by an upstream frusto-conical surface starting from the outlet opening of the diffuser and terminating along a flat transverse section AB perpendicular to the direction of flow and by a downstream frusto-conical surface starting from said section AB which as already mentioned may be reduced to a point.

If the air or the like combustion-sustaining fluid is admixed with fuel so as to form an inflammable mixture and if the total temperature $T_1$ reached by the general stream for a Mach number $M_1$ is sufficiently high, the mixture is inflamed in registry with the transverse section AB of the shock wave and begins burning permanently under detonating or substantially detonating conditions on the downstream side of said shock wave. Said detonating combustion is stabilized within an area Z of a restricted extent lying at a distance from the diffuser and from the chamber walls.

The diffuser may be given a simple frusto-conical shape as illustrated in FIG. 2 or else as in the case of FIG. 3 it may assume the shape of a geometrical solid of revolution diverging streamdownwards and bounded by a shaped wall the longitudinal cross-section of which tapers at both ends so as to cut out the shock wave effects produced, as well-known in the art, by the impact of a supersonic stream on hindrances extending perpendicularly to the direction of flow.

The chamber 1 may, as illustrated in FIG. 4, be interrupted by a peripheral gap between a section registering with the downstream opening of the diffuser 2 and the inlet of a channel 3 leading the combustion gases to a utilisation apparatus constituted for instance by the propulsion nozzle of a ramjet, the combustion being performed within a free stream along the path $CC_1-DD_1$. FIG. 4 shows also a thin partition 4 extending transversely of the chamber 1 and provided with a duct 5 for the fuel to be injected axially of the diffuser 2.

The chamber 1 may as well as illustrated in FIG. 5 continue uninterruptedly so as to merge into the channel 3 leading to the utilisation apparatus. It should be remarked that the chamber walls are protected against the high temperatures gases flowing inside the area Z by the annular or outer stream of air flowing at a speed corresponding to the Mach number $M_e$.

The distance $L_o$ between the fuel injection nozzle and the inlet of the diffuser is defined experimentally in a manner such that, taking into account the diffusion of gas passing out of the central stream and entering the annular stream, the latter may not receive any fuel (which would then not serve for the actual combustion) and also in a manner such as the entry of air inside the frusto-conical diffuser is not disturbed.

When the combustion chamber forms part of a ramjet equipping a body flying at a supersonic speed, there may be provided ahead of the chamber 1 (FIG. 6) an inlet 6 for atmospheric air, while the partition 4 carrying the fuel nozzle may be located at the input of the ramjet. The partition 4 and the fuel injecting nozzle 5 may also be located near the input of the diffuser 2 as illustrated in FIG. 7.

FIGS. 8 to 12 illustrate solely by way of axample a practical embodiment of a supersonic burner operating on a freely flowing stream as illustrated diagrammatically in FIG. 4, said burner being equipped so as to alloy an easy experimental checking of the operation.

In the case of the burner illustrated in said FIGS. 8 to 12, the outer chamber is constituted by the following parts:

a cylindrical section 1a into which air is fed at a supersonic speed corresponding to a Mach number $M_1$.

a cylindrical section 1b provided with two diametrically opposed grooves 7 and 8 adapted to be engaged by tenons 9 and 10 carried at the ends of a thin radial partition 4, the upstream and downstream edges of which are of a reduced thickness and inside which are provided a radial fuel-feeding duct 5 and an axial duct 5a through which the fuel passing out of the radial duct 5 is urged into the stream of air. The cylindrical section 1b is provided with a flange 11 enclosing a duct for connection with the pipe 12 feeding the fuel into the duct 5.

an intermediate cylindrical section 1c surrounding the diffuser 2.

a cylindrical section 1d provided with diametrically opposed grooves 15 and 16 adapted to be engaged by tenons 17 and 18 formed on a radial partition 19 the upstream and downstream edges of which are of a reduced thickness, which partition 19 serves as a support for the diffuser 2.

a section 20 adapted to be fitted on the wall 21 of an observation chamber provided with sight holes or portholes through which it is possible to examine the flame and to execute all the desired measurements.

All these chamber sections are secured together by flanges such as 22, 22a associated with centering grooves and ribs 23. They may be constituted, as also the diffuser 2 and partitions 4 and 19 by light material since they are never in contact with the flame.

The above-described apparatus has been operated as follows:

Mach number of the general supersonic stream $M_1=2.5$

Total temperature as measured on the upstream end of the injection nozzle $T_1=200°$ K.

Diameter of the stream $D_1=86.4$ mm.

Diffuser: Inlet diameter $d_1=33.2$ mm. Outlet diameter $d_2=49$ mm. Lenght L=230 mm.

Fuel injection nozzle: diameter of the nozzle: 1.5 mm. distance between the outlet of the injection nozzle and the inlet of the diffuser $L_o=78$ mm. injection pressure: 6 hpz general air throughput: 0.9 kg/sec. Air throughput for the inflammable mixture: 0.133./sec.

The following table shows by way of example different fuel air ratios used with such a burner; the fuel used being constituted by hydrogen.

| Throughput of hydrogen per second | Ratio between the volume of hydrogen and air |
| --- | --- |
| 1.14 | 1.1 |
| 2.10 | 2 |
| 3.96 | 3.9 |
| 5.82 | 5.6 |
| 7.55 | 7.3 |

FIG. 13 illustrates an embodiment corresponding to the diagrammatic FIG. 6 wherein the combustion gases are fed into the propelling nozzle 24 of a ramjet, whereas the annular or outer stream of air escapes through an annular gap 25 extending between the outer periphery of said nozzle 24 and the chamber 1 so as to cool the wall of said nozzle.

FIG. 14 illustrates means for adjusting the throughput of air entering the combustion chamber, said air being constituted for instance by atmospheric air entering a ramjet equipping an aircraft flying at supersonic speed. Said adjusting means include a needle 26 the upstream end of which is shown at E while its downstream end forms bulbous head 27. An adjustement of the axial location of said needle with reference to the convergent inlet 28 of the chamber 1 allows adjusting the throughput and the Mach number of the entering stream of air. It should be remarked that if $M_v$ is the Mach number corresponding to the flying conditions of the aircraft, the air input arrangement slows down the flow of air down from the Mach number $M_v$ until it reaches the Mach number $M_1$ considered at the beginning of the present disclosure.

It has been mentioned hereinabove that the diffuser may also be convergent so as to decelerate the central or inner stream and to accelerate the annular or outer stream. Such an arrangement is illustrated in FIGS. 15 and 16 wherein the reference number 1 designates again the chamber through which a stream flows at a speed corresponding to the Mach number $M_1$. The reference number 2a designates a convergent diffuser for the central stream for which the Mach number has thus decreased down to the value $M_i$, whereas the annular stream is in contradistinction accelerated up to the value $M_e$. In the present case $M_e$ is larger than $M_i$. The two streams meet at the downstream end of the diffuser and produce there a system of shock waves assuming the shape of a body of revolution including a frusto-conical surface leading to a flat annular surface defined by the circular lines $AA_1$-$BB_1$ lying in a transverse plane and the downstream side of which forms the starting area of frusto-conical shock waves of a reversed conicity. When as illustrated there is arranged on the upstream end of the diffuser 2a a series of short radial partitions such as $4_1, 4_2, 4_3, \ldots 4_n$ provided for the injection of fuel through corresponding channel $5_1, \ldots 5_n$, a permanent detonating or substantially detonating combustion is obtained starting in a downstream direction from the annulus $AA_1$-$BB_1$ which combustion is stabilized within an annular area $Z_1$ while a stream of air flows at a supersonic speed through the center of said area. The peripheral location of the flame allows bringing into contact therewith members such as 29 and 30 of which the surfaces $GH, G_1H_1$ are to be subjected to the action of a high temperature while use may be made if required of the electric charges appearing in such a case within the plasma formed in the area $Z_1$ and the temperature of which is very high.

The above-described supersonic combustion chamber and burner may be of revolution round the axis, as illustrated in FIG. 13 or else it may as well be of revolution round an axis $XX_1$ (FIG. 17) which is different from but preferably parallel with the axis of the stream flowing through the combustion chamber. There is thus obtained an annular combustion chamber which can be fitted round a flying body which is to be propelled at supersonic speed. In FIG. 17, the flying body 31 such as an aircraft or a missile for instance is surrounded by an annular combustion chamber 32 the cross-section of which includes an annular cylindrical channel bounded by walls 33, 34 and inside which is housed a diffuser having frusto-conical walls 35–36. The annular channel 33, 34 is located downstream of an inlet 37 collecting atmospheric air and converging in a downstream direction, said annular channel being followed by a divergent exhaust nozzle 38. The connection between the chamber 32 and the machine to be propelled is constituted by substantially radial partitions 39 which serve also for the feeding of fuel through channels 40 provided inside said partitions. The diffuser is carried inside the combustion chamber by radial partitions 41.

The arrangement of the fuel injecting nozzle is similar to that illustrated in FIG. 16 and it will be readily understood that it is possible to modify the throughput of fuel projected through the elementary injection nozzles $4_1, 4_2, \ldots 4_n$ so as to adjust the heat energy evolved in different axial planes. In other words, this allows producing a dissymetrical thrust for the ramjet in order to guide the aircraft or the like machine along the desired path. Thus, the machine is simultaneously propelled, sustained and controlled by the actual propulsion unit which allows cutting out sustaining and controlling rudders and ailerons.

A combustion chamber and burner operating on supersonic streams in accordance with the invention may also be considered as produced by a translational movement of the cross-sectional arrangement illustrated in one of FIG. 3, 4 or 13 for instance in a direction perpendicular to the plane of said figures, so as to form a chamber assuming a generally prismatic shape. Such an arrangement allows executing a flat ramjet such as that illustrated at 42 in FIGS. 18 and 19. Such a ramjet may be located for instance near the trailing edge 43 of the wing 44 of an aircraft or the like machine flying at supersonic speed.

Of course, the invention is by no means limited to the details described hereinabove which have been disclosed solely by way of exemplification.

In particular, the outer wall may of course differ from a cylinder or from a volume having a constant cross-section and it may be convergent or divergent. Similarly, the inner channel instead of being convergent or divergent might if required be cylindrical or assume an unvarying cross-section.

I claim:

1. A method for producing permanent combustion under substantially detonating conditions, comprising the steps of subdividing a stream of combustion-sustaining fluid flowing at supersonic speed into two parallel streams; modifying the speed of at least one of said parallel streams to make the latter flow at different speeds over predetermined paths; injecting fuel into the stream flowing at the higher speed; and constraining the parallel streams flowing at different speeds to mix at the downstream end of said paths to thereby produce a system of shock waves bounded by a surface converging first in the direction of flow and diverging thereafter and having thus a transverse cross-section of minimum area, so as to cause the combustion to start in the vicinity of said transverse cross-section of minimum area.

2. A method as claimed in claim 1, wherein the subdivision of the stream is performed in coaxial relationship whereby the system of shock waves assumes a substantially diabolo shape.

3. A burner for producing permanent combustion under substantially detonating conditions in a stream of combustion-sustaining fluid flowing at supersonic speed, comprising an outer chamber through which the stream of fluid is adapted to flow; a channel section extending longitudinally inside said chamber to form with the latter a gap, the stream being subdivided by said channel section into two fractions flowing respectively through the latter and through the gap; means modifying the cross-sectional area of at least one of the passageways formed by the channel section and the gap to constrain one of the stream fractions to flow at a higher speed than the other; means feeding fuel into the stream fraction flowing at a higher speed; the stream fractions meeting again at the downstream end of the channel section to form a system of shock waves bounded by a surface converging first in the direction of flow and diverging thereafter and having thus a transverse cross-section of minimum area, the substantially detonating combustion starting in the vicinity of said transverse cross-section of minimum area.

4. A burner as claimed in claim 3, wherein the channel section is in the shape of a divergent diffuser to accelerate the stream fraction in the latter.

5. A burner as claimed in claim 3, wherein the outer chamber stops short of the channel section in a downstream direction.

6. A burner as claimed in claim 3, wherein the outer chamber continues beyond the downstream end of the channel section in a downstream direction.

7. A burner as claimed in claim 3, wherein the fuel is injected streamupwards with reference to the inlet of the channel section.

8. A burner as claimed in claim 3, wherein the fuel is injected in the vicinity of the inlet of the channel section.

9. A burner as claimed in claim 3, wherein the outer chamber and the channel section are made of a light material.

10. A burner as claimed in claim 3, wherein the channel section is convergent in the direction of flow to decelerate the stream fraction flowing through it and to accelerate the stream fraction flowing through the gap and the fuel feeding means open into said gap.

11. A burner as claimed in claim 3, wherein the chamber and the channel section are arranged coaxially round the axis of the stream entering the chamber.

12. A burner as claimed in claim 3, wherein the chamber and the channel section are prismatic in shape and their cross-sections in a direction perpendicular to the axis of flow of said stream form homothetic polygone.

13. In combination with the body of a flying machine, propelled at supersonic speed, the provision of a ramjet including a combustion chamber through which a stream of air is adapted to flow at supersonic speed; a channel section extending longitudinally inside said chamber to form with the latter a gap, the air stream being subdivided by said channel section into two fractions flowing respectively through the latter and through the gap; means modifying the cross-section of at least one of the passageways formed by the channel section and the gap to constrain one of the stream fractions to flow at a higher speed than the other; means feeding fuel into the stream fraction flowing at a higher speed; the stream fractions meeting again at the downstream end of the channel section to form a system of shock wave bounded by a surface converging first in the direction of flow and diverging thereafter and having thus a transverse cross-section of minimum area, the substantially detonating combustion area starting in the vicinity of said transverse cross-section of minimum area.

14. A ramjet as claimed in claim 13, wherein the combustion chamber is flat and extends in the vicinity of the trailing edge of the wing of the machine body.

15. A ramjet as claimed in claim 13, wherein the ramjet surrounds the body of the flying machine, and the fuel feeding means comprise a plurality of fuel injecting nozzles distributed annularly, as well as means for selectively adjusting the fuel flow-rate through each of said nozzles.

* * * * *